United States Patent
Nau et al.

(10) Patent No.: US 6,782,877 B2
(45) Date of Patent: Aug. 31, 2004

(54) METHOD AND ARRANGEMENT FOR CONTROLLING A CHARGER

(75) Inventors: Michael Nau, Dornhan/Aischfeld (DE); Michael Baeuerle, Ditzingen-Heimerdingen (DE); Carsten Reisinger, Stuttgart (DE); Guido Porten, Enzweihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/355,174

(22) Filed: Jan. 31, 2003

(65) Prior Publication Data

US 2003/0140905 A1 Jul. 31, 2003

(30) Foreign Application Priority Data

| Jan. 31, 2002 | (DE) | 102 03 973 |
| Mar. 22, 2002 | (DE) | 102 12 984 |
| Aug. 6, 2002 | (DE) | 102 35 891 |

(51) Int. Cl.$^7$ .................. F02B 33/00; F02B 33/44; F02M 25/07
(52) U.S. Cl. ............ 123/559.3; 60/607; 60/608; 60/609; 60/612
(58) Field of Search .............. 123/559.3; 60/607, 60/608, 609, 612

(56) References Cited

U.S. PATENT DOCUMENTS

| 4,981,017 A | * | 1/1991 | Hara et al. ............... 60/608 |
| 5,076,059 A | * | 12/1991 | Okada ..................... 60/608 |
| 5,076,060 A | * | 12/1991 | Adeff ...................... 60/608 |
| 5,771,868 A | * | 6/1998 | Khair ...................... 60/609 |
| 6,029,452 A | | 2/2000 | Halimi et al. |
| 6,182,449 B1 | * | 2/2001 | Halimi et al. ............ 60/608 |

FOREIGN PATENT DOCUMENTS

| DE | 197 40 968 | 3/1999 |
| DE | 101 24 543 | 11/2002 |
| WO | WO97/33081 | 9/1997 |

* cited by examiner

Primary Examiner—Sheldon J Richter
(74) Attorney, Agent, or Firm—Walter Ottesen

(57) ABSTRACT

The invention is directed to a method and an arrangement for controlling a charger (2000, 1000) which make possible a reduction of the load on the on-board electrical system especially during run-up of the charger (2000, 1000). A drive signal is formed which drives the charger (2000, 10000 1000). In dependence upon a first operating state of the engine (1005) which directly precedes an increase of the driver command torque, the drive signal is so formed that the charger (2000, 1000) increases its rpm already during this first operating state.

18 Claims, 5 Drawing Sheets

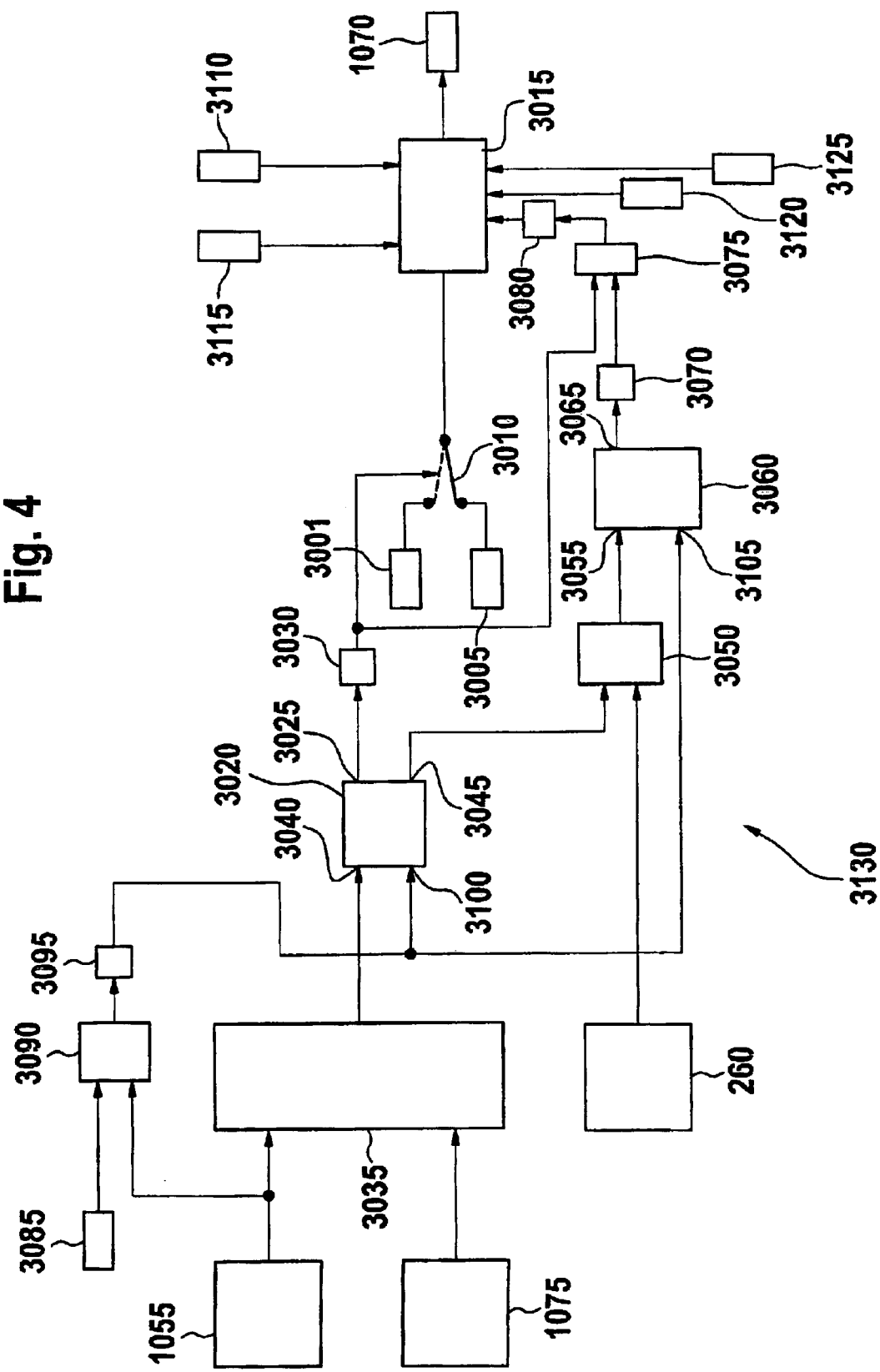

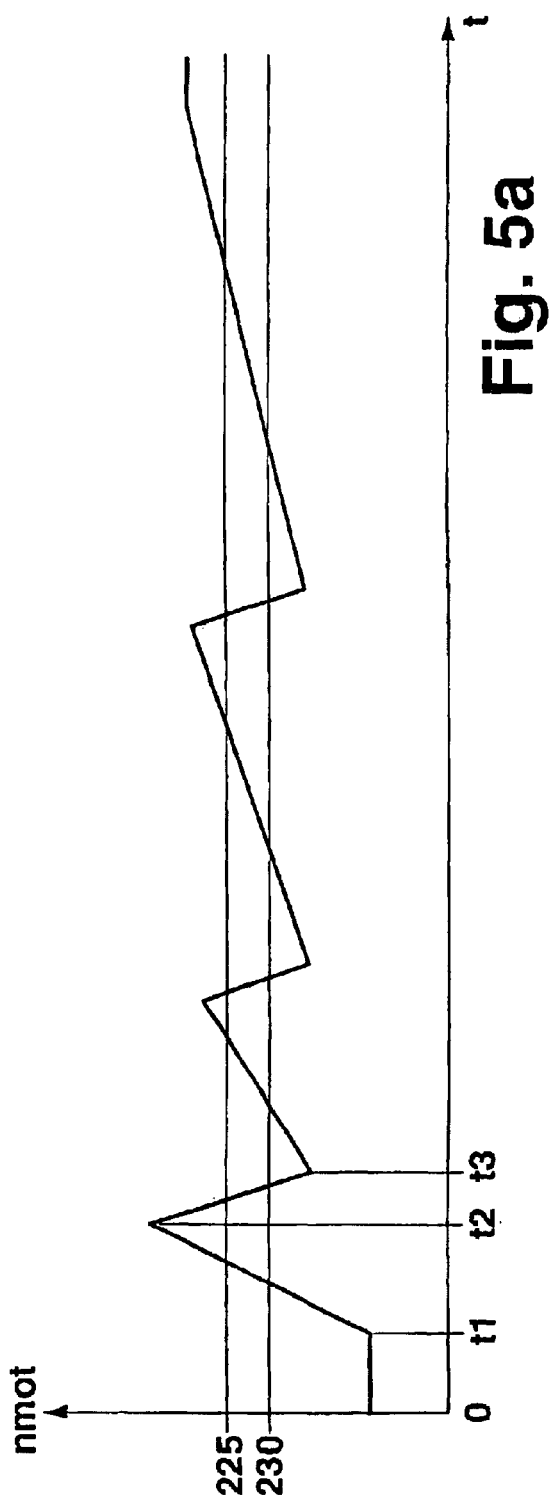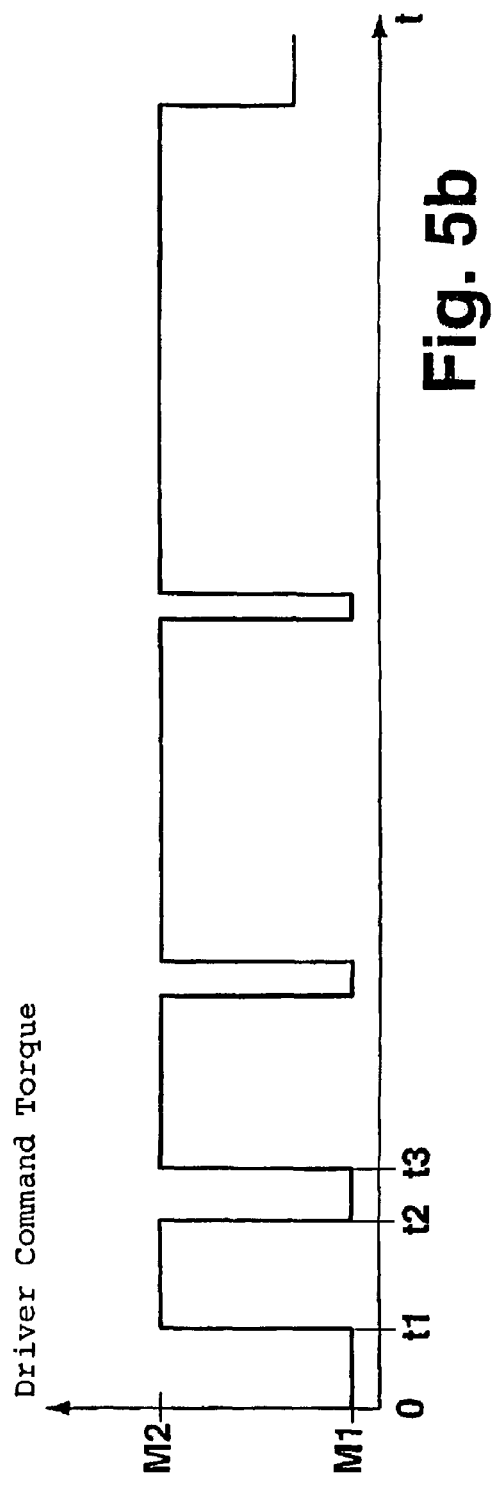

METHOD AND ARRANGEMENT FOR CONTROLLING A CHARGER

BACKGROUND OF THE INVENTION

It is known to increase the power of an internal combustion engine by compressing the air, which is needed for the combustion of the fuel, by means of an exhaust-gas turbocharger. The exhaust-gas turbocharger includes a turbine and, a compressor operated by the engine in the air intake manifold. Exhaust-gas turbochargers, especially in motor vehicle drive systems, have the disadvantage of a delayed and inadequate response performance at low rpms of the engine. To improve the response performance of the exhaust-gas turbocharger, it is known to support the exhaust-gas turbocharger by means of an electric auxiliary drive. This can be achieved, for example, with an electric motor integrated into the exhaust-gas turbocharger. This motor supportingly drives the shaft of the turbocharger at low rpms of the engine. This, however, causes a high rpm loading of the electric motor as well as a high requirement on electric power because of the high mass inertial torques of the turbine of the exhaust-gas turbocharger.

To avoid these disadvantages, it is, for example, known from U.S. Pat. No. 6,029,452 to operate an electrically operated charge air compressor in the air intake manifold in series with a conventional exhaust-gas turbocharger. The charge air compressor is also referred to as an electrically operated auxiliary charger. This arrangement affords the advantage that the electrically operated auxiliary charger can be optimized to the lowest rpm range of the internal combustion engine, and the power requirement of the auxiliary charger is clearly less because of the significantly lower mass moment of inertia. The electrically operated auxiliary charger is utilized separately in the air intake manifold.

German patent publication 101 24 543 discloses a method and an arrangement for controlling an electrically operated charger which cooperates with an exhaust-gas turbocharger for compressing the air supplied to the engine. The drive of the electric charger takes place via a drive signal which is formed in dependence upon a pregiven value for the compressor pressure ratio of the electric charger.

German patent publication 197 40 968 discloses the determination of a desired value for the air mass flow in the intake manifold in dependence upon the driver command. From European patent publication 885 353, it is known to determine a desired throttle flap angle and a desired charge pressure value on the basis of the desired charge derived from the driver command.

SUMMARY OF THE INVENTION

It is an object of the invention to provide a method and an arrangement for controlling a charger which affords the advantage with respect to the foregoing that the drive signal is formed in dependence upon a first operating state of the engine, which directly precedes an increase of the driver command torque, in such a manner that the charger increases its rpm already during this first operating state. In this way, the charger already runs up before its auxiliary compression is needed to realize the increased driver command torque. In a subsequent second operating state for increasing the driver command torque, the required target rpm of the charger is reached more rapidly, that is, the increased driver command torque is more rapidly realized. The increase of the rpm in the second operating state from the increased rpm, which is reached already in the first operating state, to the target rpm imposes also a lower load on the on-board electric system. A positive regenerative effect results with a coaction of the charger and the exhaust-gas turbocharger for compressing the inducted air of the engine. The positive regenerative effect has the consequence that the exhaust-gas turbocharger also runs up with the increase of the rpm of the charger in the first operating state. In this way, the increased driver command torque is still more rapidly achieved in the second operating state.

It is especially advantageous when the first operating state is achieved with the actuation of a clutch. In this way, the clutch actuation can already be used in a start-to-move operation or in advance of an acceleration operation for running up the rpm of the charger. In a vehicle having an automatic transmission, the first operating state can be detected by the release of the brake pedal by the driver's foot (detectable, for example, by the opening of the brake switch) while a drive stage is set. The torque of the engine, which is requested by the driver (that is, the driver command torque) is reached in this way more rapidly during a start-to-drive operation or an acceleration operation.

A further advantage is that with the increase of the rpm during the first operating state, a first bypass is opened with this bypass being connected in parallel with the charger. In this way, no compression is effected by the increase of the rpm of the charger in the first operating state and the load on the on-board electrical system is thereby considerably reduced. In the first operating state, there is a free run-up of the charger without load.

What is especially advantageous is that in the configuration of the charger as an electric auxiliary charger, during the first operating state, the rpm of the electric auxiliary charger is increased to a pregiven value and/or is increased at a pregiven slope and that the pregiven value for the rpm is formed in dependence upon the formation of the rpm of the electric auxiliary charger for at least a previous increase of the driver desired torque. In this way, the pregiven value for the rpm can be adjusted in dependence upon the type of driver or in dependence upon the driver behavior.

A further advantage is that, during the first operating state, a torque reserve is formed. In this way, the switch-on jolt for a switch-on of the charger is compensated in a first operating state.

A further advantage is that the torque reserve is formed in dependence upon the formation of the rpm of the electric auxiliary charger for at least a previous increase of the driver command torque. In this way, the torque reserve can be adjusted in dependence upon the type of driver or on the driver behavior.

A further advantage is that, in the first operating state of the engine, an operating variable (especially an engine rpm) of the engine is estimated for the subsequent second operating state and that the rpm of the electric auxiliary charger is increased in the first operating state when the estimated operating variable lies in a pregiven operating range. In this way, substantially the entire duration of the first operating state can be utilized for increasing the rpm of the electric auxiliary charger so that, with the start of the second operating state, the target rpm of the electric auxiliary charger can be reached more rapidly and with lower load on the on-board electric system starting from the already increased rpm of the electric charger which is already reached in the first operating state. The target rpm is required to realize the increased driver command torque.

A further advantage is that the estimation of the operating variable is carried out based on a set gear stage of a transmission which is to be expected in the subsequent second operating state. In this way, the estimate of the operating variable can be carried out especially simply especially for a first operating state configured as a shift operation.

A further advantage is that with the configuration of the charger as a mechanical auxiliary charger, the drive signal can be formed during the first operating state so that a shift clutch of the mechanical auxiliary charger is closed to a crankshaft of the engine. In this way, an accelerated arrival at the target rpm can be achieved in the second operating state for the mechanical charger. Furthermore, a switch-on jolt of the mechanical charger is considerably reduced in the second operating state and is undertaken in the first operating state. This increases driving comfort.

A further advantage is that, during the first operating state, a second bypass is closed which is connected in parallel to the mechanical auxiliary charger. In this way, the charge pressure or the compressor pressure ratio of the mechanical auxiliary charger is already built up in the first operating state so that an increased charging pressure is already present at the start of the second operating state and the target rpm of the mechanical auxiliary charger is reached even more rapidly.

Furthermore, with this measure, the switch-on jolt of the second operating state is further reduced and the driving comfort increased.

BRIEF DESCRIPTION OF THE DRAWINGS

The invention will now be described with reference to the drawings, wherein:

FIG. 4 shows a block circuit diagram for the determination of a pregiven rpm;

FIG. 5a shows a trace of the engine rpm as a function of time for an acceleration operation; and, FIG. 5b shows a trace of the driver command torque as a function of time for the acceleration operation of FIG. 5a.

DESCRIPTION OF THE PREFERRED EMBODIMENTS OF THE INVENTION

Figure 1:
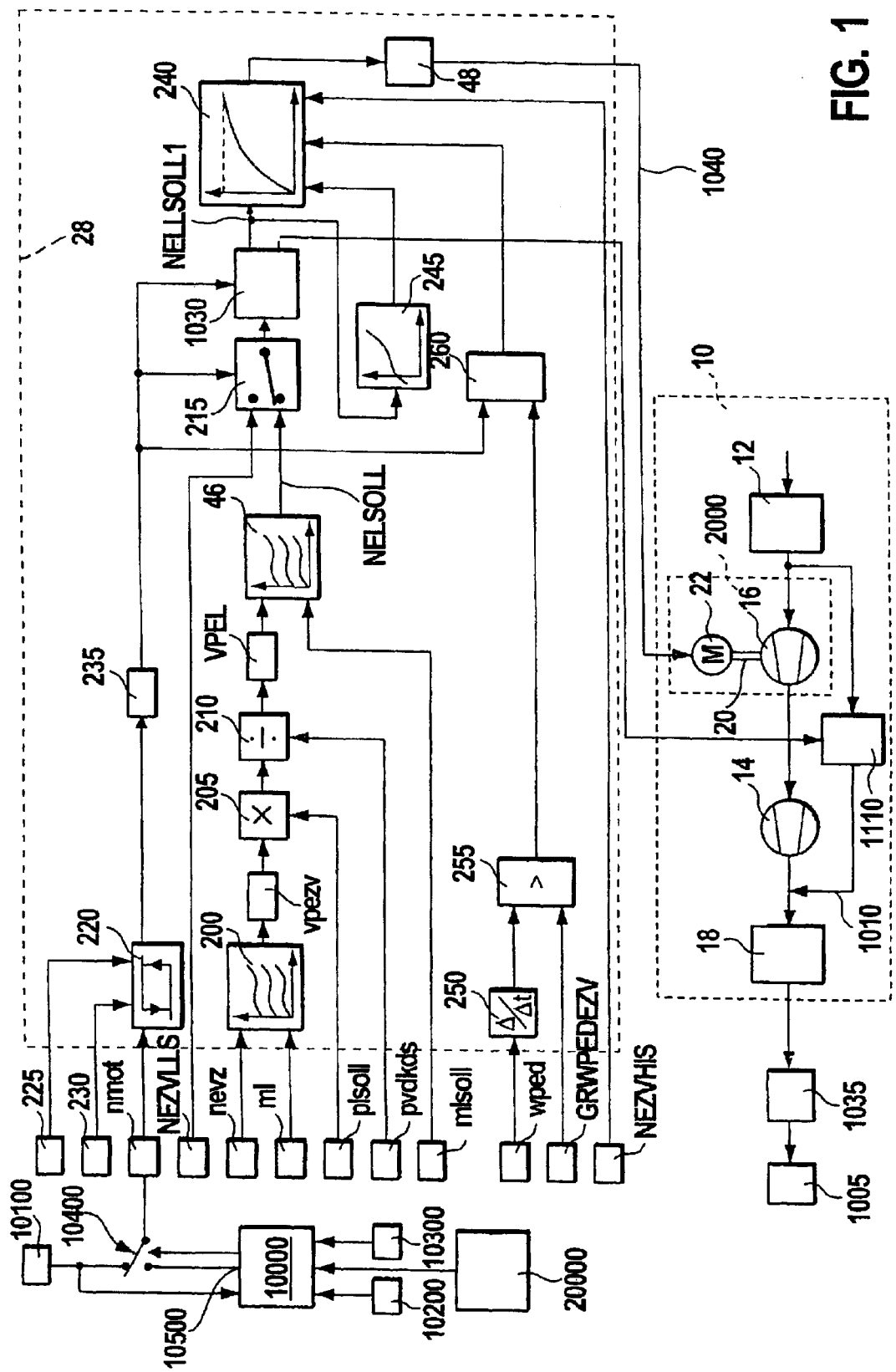
FIG. 1 shows an overview block circuit diagram together with a sequence diagram which describes a first embodiment of the invention.

FIG. 1 shows a schematic block circuit diagram including a sequence diagram for a satisfactory control (open loop and/or closed loop) of a charger 2000 configured as an electric auxiliary charger. In FIG. 1, the air intake system 10 of an internal combustion engine 1005 is shown schematically. The inducted air is, inter alia, guided through an air filter 12, a compressor 16 of the electric auxiliary charger 2000 and a compressor 14 of the exhaust-gas turbocharger to a charge-air cooler 18 and, from there, via a throttle flap 1035 to the engine 1005. The compressor 16 of the electric auxiliary charger 2000 is actuated via a drive shaft 20 by an electric motor 22, for example, a direct-current motor. This motor is actuated by an electronic control unit 2B via at least one drive line 1040.

The electronic control unit 28 includes at least a microcomputer in which programs are implemented which execute the control of the engine 1005 as well as the control of the electric auxiliary charger 2000. A preferred embodiment for a program for controlling the electric auxiliary charger 2000 is sketched as a sequence diagram in FIG. 1 as part of the control unit 28. The blocks used in this connection define programs, program parts or program steps, while the connecting arrows represent the flow of information.

In a manner known per se, and therefore not shown in FIG. 1, a charge pressure desired value plsoll and an air mass desired value mlsoll are determined in dependence upon load, rpm and a plurality of further parameters such as temperature, elevation, knocking state, et cetera. Specific solutions for determining these values are known from the state of the art referred to initially herein and incorporated by reference. The charge pressure desired value serves here for the charge pressure control in combination with a charge pressure actual value for driving the exhaust-gas turbocharger in the closed control loop. The charge pressure actual value pvdkds is preferably measured, for example, by a pressure sensor in the flow direction ahead of the throttle flap 1035. This actual value can, however, also be modeled. The air mass desired value mlsoll is, inter alia, further processed for the adjustment of the throttle flap 1035. The further processing can, for example, be for the formation of the desired charge value.

The charge pressure actual value pvdkds, which is used herein, therefore represents the pressure forward of the throttle flap 1035, that is, this value contains the effect of the compressor 14 of the exhaust-gas turbocharger as well as the effect of the compressor 16 of the electric auxiliary charger 2000.

In FIG. 1, reference numeral 200 identifies a characteristic field for determining an actual compressor pressure ratio vpezv of the electric auxiliary charger 2000 in dependence upon an actual rpm nezv of the electric auxiliary charger 2000 and an air mass actual value ml, that is, an actual value for the air flow to the engine. In a multiplier member 205, the instantaneous compressor pressure ratio vpezv is multiplied by the charge pressure desired value plsoll, which is determined, as described, in dependence upon load, engine rpm and a plurality of additional parameters such as temperature, elevation or ambient pressure pu, knocking state, et cetera. Thereafter, in a division member 210, the product vpezv*plsoll is divided by a charging pressure actual value pvdkds. The charge pressure actual value pvdkds is measured by a pressure sensor in flow direction after the electric auxiliary charger 2000 and the compressor 14 of the exhaust-gas turbocharger, that is, forward of the throttle flap 1035. The charge pressure actual value can, however, also be modeled. At the output of the division member 210, there results the desired value VPEL for the compressor pressure ratio of the electric auxiliary charger 2000. Therefore, the following applies:

$$VPEL = vpezv*plsoll/pvdkds \quad (1)$$

The relationship (1) can be derived from the following relationship:

$$VPATL = plsoll/(pu*VPEL) \quad (2)$$

When the input pressure of the electric auxiliary charger 2000 is in close approximation to the ambient pressure pu, then the output pressure of the electric auxiliary charger 2000, which is to be adjusted, is the product of the ambient pressure pu and the instantaneous maximum available compressor pressure ratio VPEL of the electric auxiliary charger 2000, that is, pu*VPEL. This is then the instantaneous maximum available input pressure at the compressor 14 of the exhaust-gas turbocharger. In lieu of the ambient pressure pu, a measured or modeled pressure can be used at the output of the air filter 12. With the instantaneous compressor pressure ratio vpezv of the electric auxiliary charger 2000, there results the charge pressure actual value pvdkds at the output of the compressor 14 of the exhaust-gas turbocharger as $$pvdkds=pu*VPATL*vpezv \qquad (3)$$

The relationship (1) results when the relationship (3) is solved for VPATL and inserted into the relationship (2).

From the above, it follows that, in accordance with the embodiment of FIG. 1 for satisfactory drive of the electric auxiliary charger 2000, information as to the contribution of the compressor 14 of the exhaust-gas turbocharger for compression is by itself not necessary provided that the actual compressor pressure ratio vpezv and the charge pressure actual value pvdkds are available as measurement quantities in the manner described.

The compressor pressure ratio VPEL of the electric auxiliary charger 2000, which is to be adjusted and is available downstream of the division member 210, therefore defines a desired value for the compressor pressure ratio. This desired value is supplied to a further characteristic field 46, which defines the compressor characteristic field of the electric auxiliary charger 16. This characteristic field is determined likewise, for example, from test stand measurements. In this characteristic field, the desired rpm NELSOLL of the electric auxiliary charger 2000 is determined in dependence upon the desired pressure ratio of the electric auxiliary charger 2000. This takes place in dependence upon the compressor pressure ratio VPEL of the electric auxiliary charger 2000 (which is to be adjusted and is computed as above) and the driver command dependent air mass desired value mlsoll. The desired rpm NELSOLL is determined as the desired rpm value in dependence upon these quantities and is supplied to the rpm control 48. This control forms drive signals for the motor 22 of the electric auxiliary charger 2000 on the basis of the desired rpm NELSOLL and an actual rpm which, for example, can be determined by measuring the current through the motor 22 of the electric auxiliary charger 2000. The motor 22 then rotates at the pregiven desired rpm NELSOLL.

The characteristic field 200 for determining the instantaneous compressor pressure ratio vpezv of the electric auxiliary charger 2000 is inverse compared to the compressor characteristic field 46 in view of the input and output quantities: the rpm of motor 22 of the electric auxiliary charger 2000 and the compressor pressure ratio of the electric auxiliary charger 2000.

Optionally, and as shown generally in FIG. 1, a switch 215 can be provided with which, depending upon the switch position, either the desired rpm NELSOLL or a rest rpm NEZVLLS is selected as a desired rpm value for transmission to the rpm control 48.

In order to hold the on-board electrical system load of the vehicle low and to switch in the electric auxiliary charger 2000 only when required, it can be provided to switch off the electric auxiliary charger 2000 when the engine rpm nmot of the engine (which can be configured as an internal combustion engine) lies above a first pregiven engine rpm 225.

In addition, to prevent a continuous switching on and off of the electric auxiliary charger 2000, it can be provided that the electric auxiliary charger 2000, after switchoff is again switched on when the engine rpm nmot drops below a second pregiven engine rpm 230 which is less than the first pregiven engine rpm 225. In this way, a hysteresis function can be realized as identified in FIG. 1 with reference numeral 220.

A bit 235 is set for the case when the first pregiven engine rpm 225 is exceeded by the engine rpm nmot. The bit 235 is reset when the engine rpm nmot drops below the second pregiven engine rpm 230. If the bit 235 is set, then the electric auxiliary charger 2000 is not needed and is switched off. The switch 215 is then brought into a position in which it supplies the rest rpm NEZVLLS as the desired rpm value for the electric auxiliary charger 2000 to the rpm control 48. If the bit 235 is reset, then the electric auxiliary charger 2000 is needed and is switched on. The switch 215 is then brought into a switch position wherein it supplies the desired rpm NELSOLL as a desired rpm value to the rpm control 48.

According to the invention, means 1030 for forming a drive signal for the utilized charger is connected downstream of the switch 215. This charger here is the electric auxiliary charger 2000. With the means 1030, the rpm of the electric auxiliary charger 2000 is increased in a first operating state even though no increased torque request from the driver is present. A second operating state, however, follows directly after the first operating state and this second operating state is characterized by an increase of the driver command torque. The second operating state is characterized, for example, by a start-drive operation or by an acceleration operation. The first operating state is characterized, for example, by a state wherein the driver actuates a clutch of the engine 1005. The actuation of the clutch takes place directly in advance of a start-drive operation or an acceleration operation. For this reason, the first operating state is utilized in order to increase the rpm of the motor 22 so that, with the start of the second operating state, the target rpm, which is required for realizing an increased driver command torque, is reached more rapidly and with a lower load on the on-board electrical system starting from the rpm increased in the first operating state. In this example, the second operating state is initiated with the release of the clutch pedal and therefore the closing of the clutch.

FIG. 5a defines an ideal trace of the engine rpm nmot of the internal combustion engine as a function of time t. An acceleration operation is shown which is interrupted by several shift operations. FIG. 5b shows the trace of the driver command torque as a function of time t for this acceleration operation. From time point zero to a first time $t_1$, a start state at constant engine rpm nmot is present which is below the second pregiven engine rpm 230. From time point zero to the first time point $t_1$, it is assumed that the clutch is actuated by the driver in this example. In this way, the internal combustion engine 1005 is in a first operating state from the time point zero to the first time point $t_1$ wherein the rpm of the motor 22 is increased. At the first time point $t_1$, the clutch pedal is released and the clutch is closed so that the second operating state of the engine 1005 starts. From time point $t_1$ to a next time point $t_2$, the accelerator pedal is depressed by the driver. A corresponding driver command torque is computed by an engine control 10000 from an accelerator pedal position supplied by an accelerator pedal position detecting sensor 10300 to the engine control 10000 and this driver command torque is adjusted or controlled via actuating members (not shown), for example, by influencing the ignition angle, the injection time and/or the air supply to the engine. From the time point zero to the first time point $t_1$, the driver command torque is at the first value M1 and the driver command torque is at the second value M2 from the first time point $t_1$ to the second time point $t_2$. From the first time point $t_1$ to the second time point $t_2$, the engine rpm nmot increases ideally linearly up to a value which is greater than the first pregiven engine rpm 225. The actuating members of the control for converting the driver command torque have, however, certain dead times or response times. For this reason, the second value M2 for the driver command torque is reached only slowly, with this second value being requested from the first time point $t_1$. With the use of the electric auxiliary charger 2000, reaching the second value M2 of the driver command torque can be accelerated as described.

At time point $t_2$, at which the engine rpm nmot exceeds the first pregiven engine rpm 225, the driver actuates the clutch pedal anew and simultaneously takes the foot from the accelerator pedal in order to set the next gear stage. During this shift operation from the second time point $t_2$ to a subsequent third time $t_3$, the driver command torque drops to the first value M1 and the engine rpm nmot of the engine 1005 drops to a value below the second pregiven engine rpm 230. After the clutch engagement is completed, that is, after the clutch is closed and the clutch pedal is released at the third time point $t_3$, the driver again actuates the accelerator pedal and the driver command torque increases again to the second value M2. Correspondingly, the engine rpm nmot of the internal combustion engine 1005 again increases to a value above the first pregiven engine rpm 225. The described operation is repeated until a desired end speed is reached. If the driver command is again reached more rapidly after the individual shift operations, for example, via the described use of the electric auxiliary charger 2000, then the total acceleration operation can be shortened.

What operates disadvantageously in the acceleration operation described is, however, the fact that the electric auxiliary charger 2000 is switched off for engine rpms nmot of the internal combustion engine 1005 which exceed the first pregiven engine rpm 225. In this case, the electric auxiliary charger 2000 is already switched off at the second time point $t_2$ because, at this time point, the engine rpm nmot of the internal combustion engine 1005 lies above the first pregiven engine rpom 225. The actuation of the clutch at the second time point $t_2$ leads thereby at first not to a switch-on and therefore an increase of the rpm of the electric auxiliary charger 2000. This is only possible again when the engine rpom nmot of the internal combustion engine 1005 drops below the second pregiven engine rpm 230. According to FIG. 5*a*, the engine rpm nmot of the internal combustion engine 1005 drops below the second pregiven engine rpm 230 shortly ahead of the third time point $t_3$ so that only a fraction of the duration of the first operating state is available for the switch-on and the increase of the rpm of the electric auxiliary charger 2000 up to the third time point $t_3$ and therefore for reaching the second operating state. The rpm of the electric auxiliary charger 2000 can therefore possibly not be increased so greatly as would be possible when utilizing the total duration of the first operating state, that is, the entire time span between the second time point $t_2$ and the third time point $t_3$. This leads, in turn, to the situation that the driver command torque, which is to be adjusted starting from the third time point $t_3$, can be realized less rapidly than this would theoretically be possible. The acceleration operation is therefore not optimally shortened.

This can be gotten around in that the rpm of the electric auxiliary charger 2000 is increased more rapidly starting from the time point at which the engine rpm nmot of the internal combustion engine 1005 drops below the second pregiven engine rpm 230 at least up to again reaching the second operating state. This, however, leads to a larger load on the on-board electric system.

According to the invention, and as shown in FIG. 1, the engine control 10000 is provided, which is connected to a transmission control 20000. Furthermore, an rpm measuring device 10100 is provided for measuring the engine rpm nmot of the internal combustion engine 1005 and connected to the engine control 10000. Furthermore, a clutch pedal position detecting sensor 10200 is provided for detecting the clutch pedal position and is connected to the engine control 10000. Furthermore, the accelerator pedal position detecting sensor 10300 is provided for detecting the accelerator pedal position and is connected to the engine control 10000. Furthermore, an rpm switch 10400 is provided, which is controlled by the engine control 10000 and either connects the output of the rpm measuring device 10100 or an output 10500 of the engine control 10000 to the engine rpm input of the hysteresis function 220. The output of the rpm measuring device 10100 is also connected to the engine control 10000. This engine rpm input of the hysteresis function 220 is overwritten and is compared to the first pregiven engine rpm 225 and to the second pregiven engine rpm 230 and is characterized in FIG. 1 by nmot.

The initiation of a shift operation, for example, at the second time point $t_2$, is detected by the engine control 10000 from the measuring signals received from the clutch pedal position detection sensor 10200 and from the accelerator pedal position detecting sensor 10300 in that the clutch pedal is depressed all the way and the accelerator pedal is released at the same time.

In the event that a constantly large driver command torque (for example, according to the second value M2 in FIG. 5*b*) is interrupted by the detected shift operation, for example, at time point $t_2$, then it can be assumed in the engine control 10000 that, after completed shift operation and closing of the clutch, a similar or like high driver command torque is requested as is the case in the example shown in FIG. 5*b* starting at the third time point $t_3$.

The following are supplied to the engine control 10000 by the transmission control 20000: the transmission ratios of the individual gear stages of the vehicle transmission as well as information as to the gear stage which was last set ahead of the initiation of the shift operation, for example, at the second time point $t_2$. A transmission control is present only in vehicles having automatic transmission.

In vehicles having manual shift transmissions, the determination of the instantaneously set gear takes place directly in the engine control from the quotient (rpm of the internal combustion engine)/(vehicle speed).

The rpm of the internal combustion engine is measured at the crankshaft by an rpm transducer. The vehicle speed is, for example, computed from the wheel rpm (this wheel rpm comes, for example, from a wheel rpm transducer of the anti-blocking system or from a separate rpm transducer).

The measured engine rpm nmot of the internal combustion engine 1005 is supplied to the engine control 10000 by the rpm measuring device 10100. From this engine rpm nmot, for example at the second time point $t_2$ directly in advance of initiating the shift operation, the engine control 10000 can compute in advance the engine rpm which is adjusted after completing the shift operation which, in this example, is at the third time point $t_3$. This computation by the engine control 10000 is by division of the engine rpm nmot by the transmission ratio of the last set gear stage and by multiplication with the transmission ratio of the next higher gear stage. This advance computation can be executed by the engine control 10000 as soon as it detects the initiation of the shift operation in the manner described. This is directly after the second time point $t_2$ in the example described. The engine control 10000 then checks whether the engine rpm, which was computed in advance, is less than the second pregiven engine rpm 230. If this is the case, then the engine control 10000 causes the rpm switch 10400 to connect the output of the engine control 10000 to the engine rpm input of the hysteresis function 220. The engine rpm, which was computed in advance, is present at this output which is identified in FIG. 1 by reference numeral 10500. It can be provided that the engine control 10000 causes the rpm switch 10400 to only then connect the output 10500 of the engine control 10000 to the engine rpm input of the hysteresis function 220 when the instantaneous engine rpm nmot of the internal combustion engine 1005 lies above the second pregiven engine rpm 230. The instantaneous engine rpm nmot is determined by the rpm measuring device 10100. Otherwise, and outside of the shift phases with actuated clutch, the engine control 10000 causes the rpm switch 10400 to connect the output of the rpm measuring device to the engine rpm input of the hysteresis function 220 so that the instantaneous engine rpm nmot of the internal combustion engine 1005 is applied to the engine rpm input of the hysteresis function 220.

Accordingly, when the actual engine rpm nmot of the internal combustion engine 1005 is higher than the first pregiven engine rpm 225 in advance of the shift operation and therefore in advance of the second time point $t_2$ as shown in FIG. 5a and the in-advance computed engine rpm for the third time point $t_3$ is less than the second pregiven engine rpm 230 as shown in FIG. 5a, then the electric auxiliary charger 2000 can be switched on early and directly after the second time point $t_2$ and can be increased in its rpm. In this way, almost the entire time span from the second time point $t_2$ to the third time point $t_3$ (here, by way of example, considered for a shift operation or a first operating state during an acceleration) can be utilized for increasing the rpm of the electric auxiliary charger so that for the least possible load on the on-board electrical system, the target rpm of the electric auxiliary charger 2000 can be reached more rapidly. This target rpm is needed for realizing the increased driver command torque in accordance with the second value M2.

In this way, the rpm of the electric auxiliary charger 2000 can be increased for an acceleration operation with one or more shift operations already during the shift pauses to a pregiven value from which, after ending the particular shift operation by engaging the clutch or closing the clutch, the required target rpm of the electric auxiliary charger 2000 can be reached more rapidly. In this way, the total acceleration operation can be shortened and the acceleration performance of the vehicle can be improved.

The in-advance computation of the rpm nmot of the internal combustion engine 1005, which adjusts after completing the shift operation, defines an estimate of an operating variable of the engine 1005 for the second operating state thereof. The engine rpm nmot is an example for such an operating variable. The invention is not limited to the use of the engine rpm nmot as such an operating variable. Generally, and in accordance with the invention, an operating variable of the internal combustion engine 1005 is estimated in the first operating state of the engine for the next second operating state. The rpm of the electric auxiliary charger 2000 is increased in the first operating state when the estimated operating variable lies in a pregiven operating range which is the value range below the second pregiven engine rpm 230 for the engine rpm nmot of the internal combustion engine 1005.

If the first operating state of the engine 1005 is a shift operation of a start-drive operation or an acceleration operation, then the estimate of the operating variable takes place based on a set gear state of the transmission, which is to be expected in the next second operating state, as was described by way of example for the in-advance computation of the engine rpm nmot of the internal combustion engine 1005, which adjusts after completing the shift operation.

In a vehicle having an automatic transmission, the first operating state can be detected by the removal of the Operator foot from the brake pedal (detectable, for example, via the opening of the brake switch) for a set driving stage. The torque of the engine (that is, the driver command torque for start-drive operation or an acceleration operation), which is requested by the driver, is likewise reached more rapidly in this way.

The first operating state can additionally or alternatively also be arrived at by detecting an acceleration operation or a start-drive operation of at least one vehicle driving ahead. A detection of this kind can, for example, take place by means of adaptive distance control. Via a plausibility evaluation of the distance signals to the traffic moving ahead, such systems can detect deceleration and acceleration operations, at the present time up to at least the second vehicle driving ahead. This applies also to start-drive operations within a string of vehicles.

Figure 2:
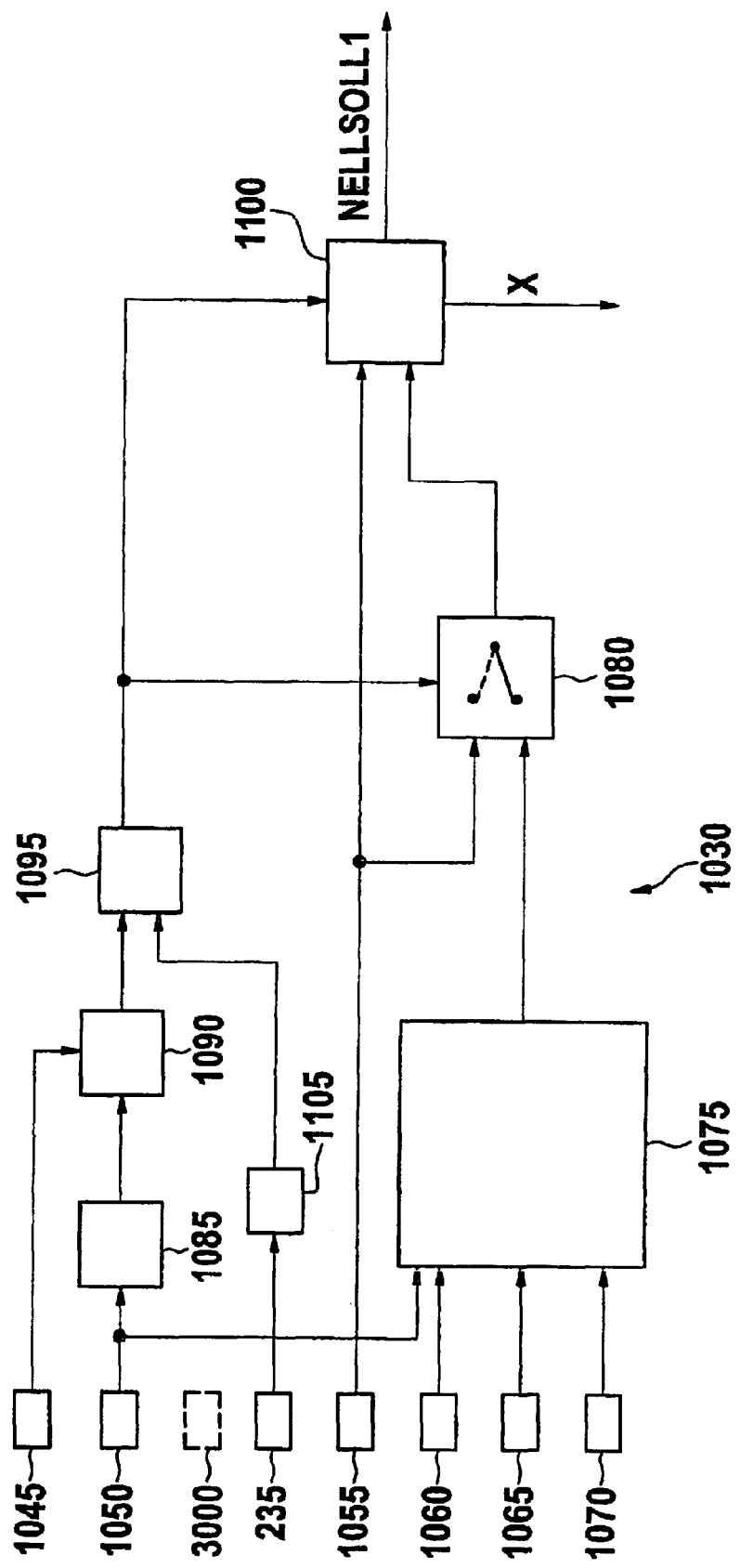
FIG. 2 shows a block circuit diagram with a sequence diagram which describes the arrangement and method of the invention in detail.

The configuration of the means 1030 is shown in greater detail in FIG. 2 and is shown with the required input quantities. A clutch actuating detection signal 1050 is supplied to a flank detector 1085. An output signal of the flank detector 1085 is supplied to a delay member 1090. An applicable time input value 1045 is also supplied to the delay member 1090. An output signal of the delay member 1090 is supplied to a run-up AND gate 1095. Furthermore, the bit 235 is supplied to a run-up inverter member 1105, which inverts the bit 235. An output of the run-up inverting member 1105 is likewise supplied to the run-up AND gate 1095. An output of the run-up AND gate 1095 controls a selection switch 1080. On the one hand, the output signal 1055 of the switch 215 is supplied to the selector switch 1080 and, on the other hand, an output signal of a ramp function module 1075 is also applied to the selector switch 1080. The output signal 1055 of the switch 215 is the rest rpm NEZVLLS or the desired rpm NELSOLL depending upon the switch position of the switch 215. The following are applied to the ramp function module 1075: an output value 1060, a slope 1065 and an applicable end value 1070. An output signal of the selector switch 1080 is supplied to a maximum selection member 1100. Furthermore, the output signal 1055 of the switch 215 is supplied to the maximum selection member 1100. A first output signal NELSOLL1 is supplied to the rpm control 48. A second output signal X is supplied to a bypass valve 1110, via which a first bypass 1010 can be opened or closed. The first bypass 1010 is connected in parallel with the compressor 16 of the electric auxiliary charger 2000 and with the compressor 14 of the exhaust-gas turbocharger.

The time input value 1045 can, for example, be 10 s. If the clutch is actuated by the driver and thereby the first operating state set, then the clutch actuating detecting signal 1050 is set. The positive flank of the clutch actuation detection signal 1050 is detected by the flank detector 1085. The flank detector 1085 thereupon outputs a set truth value TRUE as set truth bit to the delay member 1090. The delay member 1090 delays the bit duration of the truth bit to the time input value 1045, in this example, therefore, 10 s. If the bit 235 is reset during the duration of the delayed set truth bit and therefore indicates an operating situation wherein the electric auxiliary charger 2000 is needed, then, after inversion by the run-up inverting member 1105, a signal, which is likewise set to TRUE, arrives at the run-up AND gate 1095 from the run-up inverting member 1105. The output of the run-up AND gate 1095 is thereby likewise set and controls the selection switch 1080 in such a manner that it connects the output of the ramp function module 1075 to the maximum selection member 1100. The clutch actuating detecting signal 1050 is also supplied to the ramp function module 1075. The ramp function module 1075 is set during the actuation of the clutch. With the positive flank of the clutch actuating detecting signal 1050, the ramp function module 1075 outputs the output value 1060 as output desired rpm for the electric auxiliary charger 2000 via the selector switch 1080 to the maximum selection member 1100. The output desired rpm can, for example, be 500 revolutions per minute. Thereafter, and starting from output value 1060, the ramp function module computes by means of the slope 1065 additional desired rpms for the electric auxiliary charger 2000 and these additional desired rpms increase ramp-shaped up to the end value 1070 corresponding to the end desired rpm for the electric auxiliary charger 2000. The end value can, for example, be 22000 revolutions per minute. As long as the selector switch 1080 connects the ramp function module 1075 to the maximum selection member 1100, the desired rpms for the electric auxiliary charger 2000 are supplied to the maximum selection member 1100. These desired rpms are computed by the ramp function module 1075. When reaching the end value 1070, only the corresponding end desired rpm is supplied. The ramp function module 1075 is only again reset when the clutch actuation is ended and the clutch actuating detection signal 1050 is again reset. Alternatively to the described linear ramp-shaped increase of the computed desired rpm, it can also be provided that the ramp function module 1075 realizes a non-linear increase of the desired rpm and thereby a non-linear ramp function. The time from the output of the output desired rpm corresponding to the output value 1060 up to the output of the end desired rpm corresponding to the end value 1070 can amount to, for example, 0.5 s.

In the maximum selection member 1100, the larger of the two input values is outputted as a desired rpm for the electric auxiliary charger 2000. In this way, it is ensured that the electric auxiliary charger 2000 is always operated at the then largest required rpm.

If the output of the run-up AND gate 1095 is reset at the latest after the elapse of the time pregiven by the time input value 1045, then the ramp function module 1075 is again separated from the maximum selection member 1100 via switchover of the selector switch 1080. Both input quantities, and therefore also the output quantity NELSOLL1 of the maximum selection member 1100, then correspond to the output signal of the switch 215.

Additionally, it can be provided that the maximum selection member 1100 opens the bypass valve 1110 of the first bypass 1010 by means of the optionally provided second output signal X as long as the output signal of the ramp function module 1075 is selected for output in the maximum selection member 1100 and the selection switch 1080 connects the ramp function module 1075 to the maximum selection member 1100. For this purpose, and for detecting this switching state of the selection switch 1080, the output signal of the run-up AND gate 1095 can also be supplied to the maximum selection member 1100 as shown in FIG. 2. The bypass valve 1110 is also referred to as an overrun recirculation valve.

With the above measure, it is effected that no compression takes place via the compressors (14, 16) during the run-up of the rpm of the electric auxiliary charger 2000 in the first operating state and therefore a considerably less load is placed on the on-board electric system. With the switchover of the selection switch 1080 for separating the ramp function module 1075 from the maximum selection member 1100, the bypass valve 1110 of the first bypass 1010 is then again closed via the second output signal X of the maximum selection member 1100 so that the charging pressure is built up in the now-following second operating state and the target rpm, which is required by the driver command torque, can be adjusted at the electric auxiliary charger 2000 or the required desired pressure ratio across the electric auxiliary charger 2000. For a suitable selection of the end value 1070, the target rpm of, for example, 40000 revolutions per minute is then reached faster in the second operating mode starting from the end value 1070 and a lesser load is placed on the on-board electric system. This target rpm exceeds, as a rule, the end value 1070. The desired charging pressure at the output of the electric auxiliary charger 2000 is thereby made available much more rapidly.

Optionally, it can be furthermore generally provided that the desired rpm value of the electric auxiliary charger 2000 is filtered by means of a second filter 240 which should be configured, for example, as a lowpass filter. This is independent of the use of the switch 215. In FIG. 1, it is shown by way of example, that the lowpass 240 follows the means 1030. The output desired rpm NELSOLL1 is supplied to the lowpass 240 as desired rpm value.

The rpm control 48 is protected against oscillations by the lowpass 240. The time constant or the time constants of the lowpass 240 can be selected in dependence upon the output desired rpm NELSOLL1. In the following, a single time constant of the lowpass 240 is taken as a starting point by way of example. The time constant can be selected by means of a characteristic line 245 in-dependence upon the output desired rpm NELSOLL1. The trace of the characteristic line can, for example, be provided in such a manner that a smaller output desired rpm NELSOLL1 is assigned a smaller time constant and larger output desired rpm NELSOLL1 is assigned a larger time constant. This leads to the situation that a smaller output desired rpm NELSOLL1 can be adjusted more rapidly and a larger output desired rpm NELSOLL1 can be adjusted slower by the rpm control 48 following the lowpass 240. For larger output desired rpms NELSOLL1, this does not lead to an abrupt run-up of the electric auxiliary charger 2000 and therefore leads to greater driving comfort.

Alternatively, or in addition, the time constant or the time constants of the lowpass 240 can be adjusted also as parameter dependent or be characteristic field controlled, for example, in dependence upon the air mass actual value ml and/or the engine rpm nezv of the electric auxiliary charger 2000.

Optionally, it can be furthermore generally provided that a unit 250 is provided for forming a gradient of an accelerator pedal position wped as a function of time t. The gradient, which is formed by the unit 250, is supplied to a comparator 255. The comparator 255 compares the gradient to a pregiven value GRWPEDEZV. If the gradient lies above the pregiven value GRWPEDEZV, then a maximum rpm NEZVHIS is adjusted to the desired rpm value for the electric auxiliary charger 2000 and is either supplied directly to the rpm control 48 or via the lowpass 240 as shown in FIG. 1.

Additionally, and as shown in FIG. 1, it can be provided to couple the desired rpm value formation to the above-described hysteresis function with the desired rpm value formation being dependent upon the gradient of the accelerator pedal position. The output of the comparator 255 and the bit 235 are supplied to an AND gate 260. The output of the comparator 255 is set when the gradient of the accelerator pedal position lies above the pregiven value GRW-PEDEZV.

Accordingly, when the gradient of the accelerator pedal position lies above the pregiven value GRWPEDEZV and the engine rpm nmot of the internal combustion engine 1005 lies above the first pregiven engine rpm, then the maximum rpm NEZVHIS is supplied as desired rpm value to the lowpass 240. In this way, for a very rapid torque request and for an electric auxiliary charger 2000, which is either switched off or operated at low rpm, the electric auxiliary charger 2000 is precontrolled to bring the same up to high speed in a more rapid computation raster whereby a considerable gain in dynamic is achieved.

The computation of the charge pressure desired value plsoll takes place via the torque structure of the engine control and requires a corresponding running time. Furthermore, the computation path contains functions such as, for example, the load impact damping, which lead to a delayed build-up of the charge pressure desired value plsoll which, therefore, follows rapidly in the form of the gradient of the accelerator pedal position the pedal signal resulting from the actuation of the accelerator pedal.

Alternatively or as a supplement, the charge pressure desired value plsoll and the air mass desired flow mlsoll can be determined via a prediction computation. With such a prediction, the rpm build-up of the electric auxiliary charger 2000 can likewise be precontrolled, that is, be more rapidly realized. In the prediction computation, the difference between the last and the next to last charge pressure desired value (or air mass desired flow) can be determined and, based on this difference, an extrapolation can be carried out to a subsequent charge pressure desired value (or air mass desired flow) and thereby a prediction can be realized.

For the case that the first operating state is reached by detecting an acceleration operation or a start-drive operation of at least one vehicle traveling ahead, an acceleration signal 3000 can be generated or set by the system for adaptive distance control and, for example, be transmitted via a CAN bus to the electronic control unit 28. The acceleration signal 3000 is then available as an input quantity of the means 1030 as shown by the broken line in FIG. 2. The acceleration signal 3000 can then take the place of the clutch actuating detecting signal 1050. A setting of the acceleration signal 3000 then corresponds to a setting of the clutch actuating detecting signal 1050. As an alternative, it can, however, also be provided that the clutch actuating detecting signal 1050 as well as the acceleration signal 3000 are provided as input quantities of the means 1030. In this case, an OR logic element can be provided, which OR-couples the clutch actuating detecting signal 1050 to the acceleration signal 3000. The OR logic element is not shown in FIG. 2. The output signal of the OR logic element is then conducted to the flank detector 1085 and the ramp function module 1075.

For the case that the first operating state is reached by removing load from the brake pedal in a drive stage which is set in the case of an automatic transmission, the clutch actuating detecting signal 1050 can be replaced by a brake pedal relief detecting signal, which is set when a removal of load from the brake pedal is detected. This can take place via a suitable measuring device.

The use of the acceleration signal 3000 can be limited to especially start-drive critical situations such as high elevations, high ambient temperatures, operating a vehicle with a trailer, or the like.

The invention described based on the above embodiments ensures a precise control (open loop or closed loop) of the electric auxiliary charger 2000, which at the same time satisfies the requirements without unnecessary load of the on-board electrical system and without more complexity with respect to required sensor means.

When the pressure pvor ahead of the electric auxiliary charger 2000 and the pressure pnach rearward of the electric auxiliary charger 2000 in flow direction are known, then the instantaneous pressure ratio vpezv=pnach/pvor of the electric auxiliary charger 2000 can be determined via quotient formation pnach/pvor. The pressure pvor ahead of the electric auxiliary charger 2000 and the pressure pnach rearward of the electric auxiliary charger 2000 can, for example, be determined by measuring utilizing a pressure sensor both forward and rearward of the electric auxiliary charger 2000. In the above case, and starting from the embodiment of FIG. 1, the characteristic field 200 for determining the instantaneous compressor pressure ratio vpezv of the electric auxiliary charger 2000 can be omitted.

According to FIG. 1, the electric auxiliary charger 2000 is connected forward of the compressor 14 of the exhaust-gas turbocharger. The sequence of the two chargers (14, 2000) is, however, arbitrary with a view to the control of the compressor pressure ratio of the electric auxiliary charger 2000 in accordance with the invention. If, however, and in contrast to the illustration of FIG. 1, the electric auxiliary charger 2000 is mounted downstream of the compressor 14 of the exhaust-gas turbocharger in flow direction, then this is disadvantageous for the electric auxiliary charger 2000 from a thermodynamic point of view.

It can now be provided that the end value 1070 is formed as a pregiven value for the rpm in dependence upon the formation of the rpm of the electric auxiliary charger 2000 for at least one previous increase of the driver command torque. A realization possibility is shown by the block circuit diagram of FIG. 4.

In FIG. 4, 3001 identifies a store for a decrement value and 3005 identifies a store for an increment value. Either the store 3001 for the decrement value or the store 3005 for the increment value can be connected via the adaptation switch 3010 to a summation and store member 3015. The summation and store member 3015 stores the end value 1070 as a pregiven value for the rpm of the electric auxiliary charger 2000 and outputs this end value 1070 to the ramp function module 1075 as shown in FIG. 2.

The drive of the adaptation switch 3010 takes place by means of a flip flop 3020 which, for example, can be configured as an RS flip flop. The non-inverting output 3025 of the flip flop 3020 supplies the drive signal for the adaptation switch 3010 via a flank detector 3030. The output signal 1055 of the switch 215 and the output signal of the ramp function module 1075 is supplied to a comparator 3035 whose output is connected to a set input 3040 of the first flip flop 3020. The comparator 3035 supplies a set signal to the set input 3040 when the output signal 1055 of the switch 215 is greater than or equal to the output signal of the ramp function module 1075. An inverting output 3045 of the first flip flop 3020 and the output of the AND gate 260 are supplied to an AND gate 3050 whose output is connected to the set input 3055 of a second flip flop 3060 which likewise can be configured as an RS flip flop. A non-inverting output 3065 of the second flip flop 3060 is connected via a flank detector 3070 to an input of an OR gate 3075 whose other input is connected to the output of the flank detector 3030. The output of the OR gate 3075 is supplied via a further flank detector 3080 to the summation and storage member

3015. In FIG. 4, 3085 further identifies a store for an rpm limit value which, together with the output signal 1055 of the switch 215, is supplied to a comparator member 3090. The output of the comparator member 3090 is connected via a flank detector 3095 to a reset input 3100 of the first flip flop 3020 and to a reset input 3105 of the second flip flop 3060. The comparator member 3090 outputs a reset signal when the output signal 1055 of the switch 215 is less than the rpm limit value in the store 3085. The positive flank of this reset signal is detected by the flank detector 3095 and is converted into a short pulse, for example, a pulse having the duration of 10 ms or less. This pulse functions for the reset of the flip flops (3020, 3060). Furthermore, a store 3110 is provided for an upper rpm limit and a store 3115 is provided for a lower rpm limit which both are connected to the summation and storage member 3015. Furthermore, a store 3120 is provided for an initialization rpm and this store is likewise connected to the summation and store member 3015. Finally, an initialization signal 3125 can be supplied to the summation and store member 3015.

When there is an interruption of the supply voltage of the electronic control unit 28, the initialization signal 3125 is, for example, generated in the form of an initialization pulse having a duration of 10 ms. The summation and storage member 3015 is initialized by the initialization signal 3125. With this initialization, the initialization rpm is assumed from the store 3120 into the summation and storage member 3015 and is stored there. The initialization rpm is outputted to the ramp function module 1075 as end value 1070.

Next, the output signal 1055 of the switch 215 is compared in the comparator 3035 to the output signal of the ramp function module 1075. If the rpm at the output of the switch 215 is greater than or equal to the rpm outputted by the ramp function module 1075, then the comparator 3035 outputs a set pulse to the set input 3040 of the first flip flop 3020. In this way, the non-inverting output 3025 of the first flip flop 3020 is set and the inverting output 3045 of the first flip flop 3020 is reset. The positive flank of the set output signal is detected by the flank detector 3030 at the non-inverting output 3025 of the first flip flop 3020 and is converted into a pulse having a duration of, for example, approximately 10 ms or less. With the set pulse formed in this way, the adaptation switch 3010 is driven and is caused to connect the store 3001 for the decrement value to the summation and storage member 3015. At the same time, one of the two inputs of the OR gate 3075 is set with this set pulse of the flank detector 3030, whereby also the output of the OR gate 3075 is set. The set signal at the output of the OR gate 3075 is detected by the flank detector 3080 at its positive flank and is converted into a set pulse of, for example, approximately 10 ms or less. With this set pulse, the summation and storage member 3015 is activated and causes the stored rpm value to be decremented by the decrement value of the store 3001 and to store the new rpm value which is so formed and to output the same to the ramp function module 1075 as end value 1070. Accordingly, if especially for an increase of the driver command torque, an rpm of the electric auxiliary charger 2000 is formed via the path with the compressor characteristic field 46, then, for a subsequent first operating state (which operating state directly precedes a renewed increase of the driver command torque), the end value 1070 is decremented for the run-up of the electric auxiliary charger 2000. The path having the compressor characteristic field 46 is identified in the following as the characteristic field path. If the rpm of the output signal 1055 of the switch 215 drops below the rpm limit value of the store 3085, then this leads, in the manner described, to a reset of both flip flops (3020, 3060). When the output of the AND gate 260 is set with a gradient of the accelerator pedal position above the pregiven value GRWPEDEZV and the first flip flop 3020 is reset and therefore the inverting input 3045 of the first flip flop 3020 is set, then also the output of the AND gate 3050 and therefore the set input 3055 of the second flip flop 3060 is set. The positive flank of the set signal at the non-inverting output 3065 of the second flip flop 3060 is detected by the flank detector 3070 and is converted into a set pulse having the duration of, for example, approximately 10 ms or less. This set pulse is supplied to the OR gate 3075 whose output is thereupon likewise set in the manner described and the summation and storage member 3015 is activated. Since the first flip flop 3020 is reset, there is no signal at the non-inverting output 3025 of the first flip flop 3020. Without a signal at the non-inverting output 3025 of the first flip flop 3020, the adaptation switch 3010 is driven in such a manner that it connects the store 3005 for the increment value to the summation and storage member 3015 as shown in FIG. 4. With the activation of the summation and storage member 3015, the rpm value, which is stored in the summation and storage member 3015, is incremented by the increment value stored in the store 3005. The incremented rpm value is stored as a new rpm value in the summation and storage member 315 and is outputted to the ramp function module 1075 as end value 1070.

Accordingly, when an increase of the rpm of the electric auxiliary charger 2000 takes place because of an actuation of the accelerator pedal with a gradient above the pregiven value GRWPEDEZV (this is characterized as a gradient path), the end value 1070 is incremented in the manner described for a run-up of the electric auxiliary charger 2000 in a subsequent first operating state of the internal combustion engine 1005. This run-up directly precedes a subsequent increase of the driver command torque.

The reset of the two flip flops (3020, 3060) again takes place when the rpm of the output signal 1055 of the switch 215 drops below the rpm limit value in the store 3085.

The rpm value is formed in the summation and storage member 3015 via incrementation or decrementation. This rpm value is limited by the lower rpm limit in the store 3115 and the upper rpm limit in store 3110. The rpm (which is formed in the summation and storage member 3015) for the electric auxiliary charger 2000 and therefore the end value 1070 which is outputted and stored in the summation and storage member 3015, can, in this way, not drop below the lower rpm limit and cannot exceed the upper rpm limit.

With the module for forming the end value 1070, which is described in FIG. 4 and which is identified by reference numeral 3130, the type of driver or the driver behavior is considered in the determination of the end value 1070. In this way, the end value 1070 and therefore the rpm of the electric auxiliary charger 2000 can be adapted to the type of driver or the driver behavior with this rpm being maximally reached during the first operating state of the internal combustion engine 1005. In this way, a compromise between sporty driving and economy can be found. A sporty driver will place more value on a good response performance of the vehicle than on the consumption of fuel. For a suitable selection of the pregiven gradient value GRWPEDEZV, an increase of the driver command torque takes place more often via the gradient path than via the characteristic field path. For this reason, the end value 1070 in the summation and storage member 3015 has a tendency of being increased so that, in the first operating state of the engine, the driver is provided with a higher rpm of the electric auxiliary charger 2000. The response performance is of less importance than fuel consumption or acoustic comfort to a driver concerned with fuel consumption and comfort and this driver is satisfied with a lower rpm of the electric auxiliary charger in the first operating state of the engine. For a suitable selection of the pregiven gradient value GRWPEDEZV, the increase of the driver command torque would take place more often via the characteristic field path than via the gradient path for such a driver. For this reason, the end value 1070 is rather reduced in the summation and storage member 3015 for such a driver so that for the first operating state of the engine, a lower rpm is available for the electric auxiliary charger 2000.

With the module 3130 according to FIG. 4, the type of driver or driver behavior is therefore detected on the one hand and, on the other hand, the end value 1070 is adapted to the detected type of driver or to the detected driver behavior.

For a lower end value 1070 for the first operating state of the engine 1005, the generator of the vehicle is subjected to a lower load and therefore fuel is saved.

With the use of the two flip flops (3020, 3060), it is prevented that after an incrementation of the end value 1070 because of a previous increase of the driver command torque via the gradient path, thereafter a decrementation of the end value 1070 takes place because an increase of the driver command torque via the characteristic field path follows, as a rule, the increase of the driver command torque via the gradient path. With the use of the two flip flops (3020, 3060) it is, however, ensured that each increase or decrease of the end value 1070 is based on a different increase and is therefore not based on the same increase of the driver command torque. Each new change of the end value 1070 has as a condition precedent that the rpm for the electric auxiliary charger 2000, which is formed via the. characteristic field path, drops back again below the rpm limit value of the store 3085. The characteristic field path does not only mean the path via the compressor characteristic field 46, but also the use of the rest rpm NEZVLLS, that is, each rpm which is outputted via the switch 215 to the means 1030. For the values, which are stored in the stores 3001, 3005, 3085, 3110, 3115, 3120, the following values can be used by way of example: the decrement value in the store 3001 can, for example, be 1000 rpm; the increment in the store 3005 can, for example, be 2000 rpm; the rpm limit value in the store 3085 can, for example, be 10,000 rpm; the lower rpm limit in the store 3115 can, for example, be 18,000 rpm; the upper rpm-limit in the store 3110 can, for example, be 40,000 rpm; and the initialization rpm in the store 3120 can, for example, be 25,000 rpm.

The acoustic comfort is achieved at lower rpm of the electric auxiliary charger 2000 and therefore a reduction of the noise of the electric auxiliary charger 2000. The noise load because of the electric auxiliary charger 2000 is likewise reduced for the reduced rpm of the electric auxiliary charger 2000. An improved response performance of the vehicle or the electric auxiliary charger 2000 is achieved with a higher end value 1070 and therefore a higher reachable rpm of the electric auxiliary charger 2000 in the first operating state.

The selection of the store 3001 with the decrement value or the store 3005 with the increment value takes place via the adaptation switch 3010 as described in dependence upon the type of driver or on the driver behavior. However, and alternately to the above-described procedure, for driving the adaptation switch 3010, every other type of driver type detection or driver behavior detection can be used which is known to those working in the field of this invention. A driver type detection is, for example, applied in automatic shift transmissions in order to adapt the shift points to the driving technique of the particular driver.

Alternatively, it can be provided that the output of the AND gate 260 is connected to the set input 3040 of the first flip flop 3020 and the output of the comparator 3035 is connected to an input of the AND gate 3050 whose other input, as described, is connected to the inverting output 3045 of the first flip flop 3020. The adaptation switch 3010 can then be so driven that it connects the store 3001 for the decrement value to the summation and storage member 3015 without a signal on the non-inverting output 3025 of the first flip flop 3020 so that, for activation of the summation and storage member 3015, the rpm value, which is stored in the summation and storage member 3015, is decremented.

If the non-inverting output 3025 of the first flip flop 3020 is set, then the store 3005 for the increment value is connected via the adaptation switch 3010 to the summation and storage member 3015 and the rpm value, which is stored in the summation and storage member 3015, is correspondingly incremented when the summation and storage member 3015 is activated.

Figure 3:
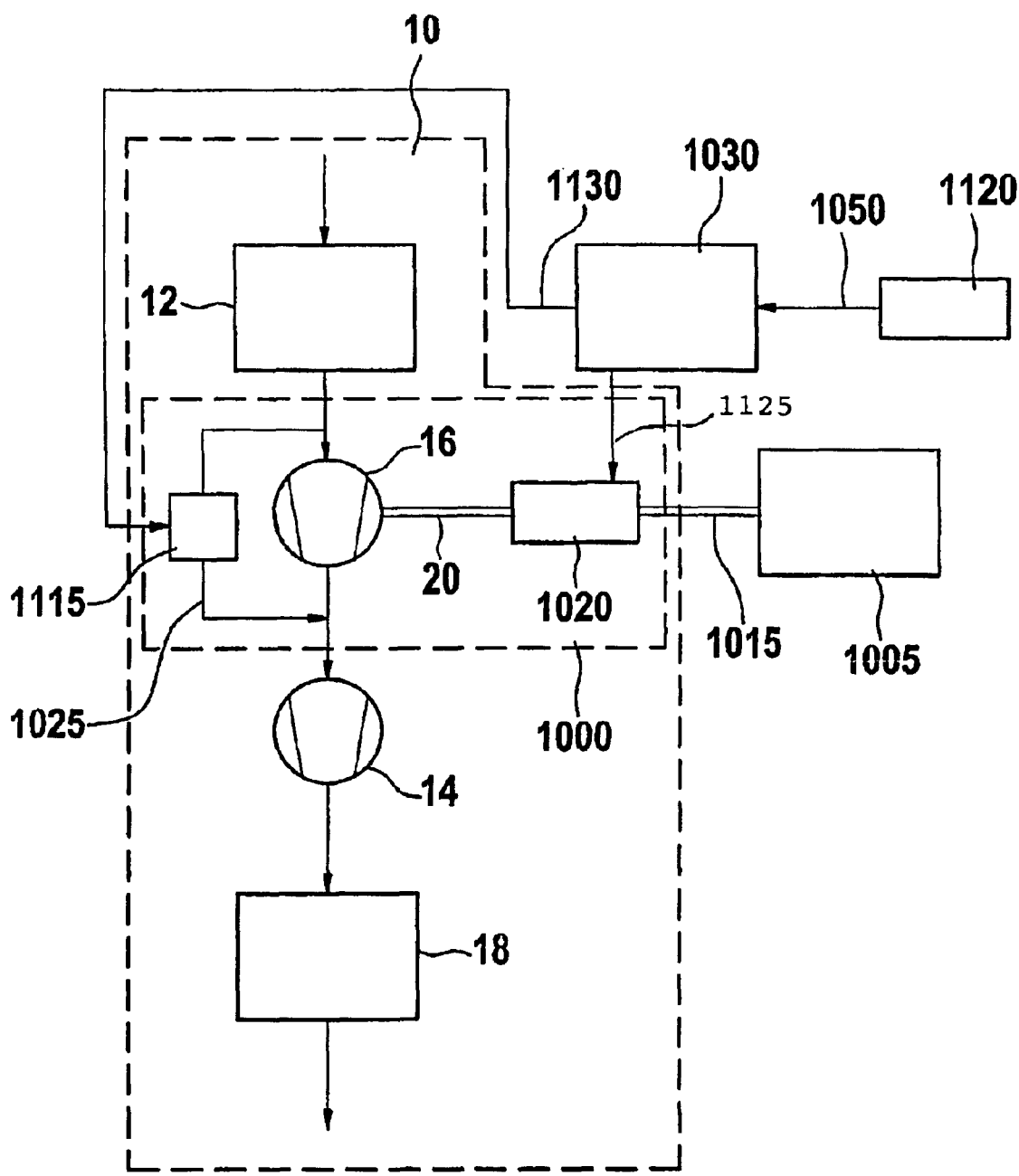
FIG. 3 shows a block circuit diagram for a second embodiment of the invention.

According to a further embodiment of FIG. 3, the charger is configured as a mechanical auxiliary charger 1000. Mechanical auxiliary chargers are usually switched on and off via electromagnetic switch-clutches. Furthermore, bypasses are used which are controllable continuously with respect to their degree of opening in order to control the charge pressure across the particular mechanical auxiliary charger. In idle and in the lower part-load range, the shift clutch and the bypass of the corresponding mechanical auxiliary charger are open. For load requests, the shift clutch is, for example, digitally closed and the bypass is controlled in correspondence to the charge pressure request. If both measures take place synchronously to increase the driver command torque, then the problem of a switch-in jolt results because of the mass inertia of the mechanical auxiliary charger which loads the crankshaft of the engine and of a charge pressure which cannot be spontaneously called up because the mechanical auxiliary charger must first fill the charge air volume.

In FIG. 3, the same reference numerals identify the same elements as in FIG. 1. The air intake system 10 in FIG. 3 corresponds to the air intake system in FIG. 1 with the difference that the charger in the embodiment of FIG. 3 is the mechanical auxiliary charger 1000. The mechanical auxiliary charger 1000 includes, in addition to the compressor 16 and the drive shaft 20, a shift clutch 1020 for establishing a force connection between the drive shaft 20 and a crankshaft 1015 of the internal combustion engine 1005. The mechanical auxiliary charger 1000 is thereby driven by the crankshaft 1015. The compressor 16 is connected in parallel by a second bypass 1025. This second bypass 1025 includes a second bypass valve 1115 via which the second bypass 1025 can be opened or closed.

The means 1030 for forming the drive signal are now connected to the second bypass valve 1115 and the shift clutch 1020. The clutch signal 1050 is supplied from a clutch 1120 of the engine 1005 to the means 1030. If the clutch 1120 is actuated by the driver and the clutch actuating detecting signal 1050 is thereby set, then the means 1030 form a first drive signal 1125 for driving the shift clutch 1020 in such a manner that the drive shaft 20 is connected to the crankshaft 1015 and the compressor 16 of the mechanical auxiliary charger 1000 is thereby driven. In this way, the actuation of the clutch 1120 effects a run-up of the compressor 16 of the mechanical auxiliary charger 1000 already in the first operating state. In this way, a more rapid run-up of the mechanical auxiliary charger 1000 is achieved in the second operating state directly after closing the clutch 1120 to the target rpm required for the adjustment of the driver command torque. In this way, a switch-on jolt because of the additional load of the crankshaft 1015 when connecting to the drive shaft 20 is essentially shifted from the second operating state into the first operating state and the driving comfort is thereby increased. The switch-on jolt then occurs considerably less disturbing than synchronously to the drive start or acceleration in the second operating state.

In the case of an automatic transmission, the clutch actuating detection signal 1050 can here also be replaced by the brake pedal release detection signal. Additionally, or alternatively, the acceleration signal 3000 can be OR-coupled to the clutch actuation detection signal 1050 or to the brake pedal release detection signal as described with respect to FIG. 2 in order to correspondingly drive the shift clutch 1020 via the means 1030.

Additionally, the means 1030 can output a second drive signal 1130 to the second bypass valve 1115 in order to close this valve when the clutch actuating detecting signal 1050 is set. In this way, already in the first operating state, the charging pressure can be built up via the compressor 16 of the mechanical auxiliary charger 1000 and the switch-on jolt can be further reduced in the second operating state. The pressure buildup in the second operating state is therefore again accelerated and a very substantial amount of charge pressure can be spontaneously called up at the actual start-drive time point or acceleration time point in the second operating state. The second bypass 1025 could alternatively also be connected in parallel to the compressor 16 of the mechanical auxiliary charger 1000 as well as in parallel to the compressor 14 of the exhaust-gas turbocharger and thereby be configured as an overrun recirculation valve.

Alternatively, it can be provided to not yet close the second bypass valve 1115 during the first operating state; rather, to close it only at the start of the actual drive-start operation or acceleration operation with the start of the actuation of the accelerator pedal by the driver. The charge pressure would then only be built up in the second operating state. This can make the air conducting system used, especially the hoses, less subject to wear.

A loading of the on-board electrical system can be neglected when using the mechanical auxiliary charger 1000 because the drive of the mechanical auxiliary charger 1000 takes place via the crankshaft 1015 of the engine 1005.

Because of a regenerative feedback effect between the charger and the exhaust-gas turbocharger, an increase of the rpm of the charger leads, in the first operating state, to an increase of the rpm of the exhaust-gas turbocharger in both described embodiments. In this way, a dynamic gain can be achieved and the exhaust-gas turbocharger is brought also more rapidly to the desired target rpm in the immediately following second operating state.

The following description applies to the electric auxiliary charger 2000 as well as to the mechanical auxiliary charger 1000. No torque request from the driver is present in the first operating state. For this reason, the switch-on jolt (similar to the switch-on of a climate control compressor) is compensated by a corresponding torque reserve. The torque reserve can likewise be activated by setting the clutch actuation detection signal 1050 or the brake pedal release detection signal. Additionally or alternatively, this activation can take place by means of setting the acceleration signal 3000. As described above, also an OR-coupling is possible between the acceleration signal 3000 and the clutch actuating detection signal 1050 or the brake pedal release detection signal for activating the torque reserve.

For the above, in advance of switching in the auxiliary charger (1000, 2000), the efficiency of the engine (with external ignition) is deteriorated in a targeted manner by shifting the ignition angle. The torque, which is outputted to the crankshaft, and the idle rpm are, however, held constant via an increase of the cylinder charge.

When the component is switched in, then the ignition angle can be shifted simultaneously again very rapidly in the direction of a higher efficiency of the engine so that the torque, which is outputted to the crankshaft, remains constant during the switch-in operation. The procedure is also applicable for internal combustion engines having self ignition when, instead of an ignition angle intervention, a later injection start is used and, in lieu of the charge, a higher injection quantity is used.

It can additionally be provided to form the torque reserve, which is formed during the first operating state, likewise in dependence upon the formation of the rpm of the electric auxiliary charger 2000 for at least one previous increase of the driver command torque. In this way, the amount of the ignition angle shift and therefore the efficiency deterioration are adapted in dependence upon the detected type of driver or driver behavior.

A higher torque reserve is made available to the sporty driver who places more value on a good response performance of the vehicle than on the fuel consumption than a driver who is concerned with consumption and comfort. This means that the amount of the ignition angle shift and therefore the efficiency deterioration for the sporty driver is adjusted to be greater than for the driver who places value on comfort and fuel consumption. The spontaneity gain or the improved response performance of the vehicle or of the electric auxiliary charger 2000 for the sporty driver is obtained at the cost of fuel consumption during the first operating state which responds to idle with the clutch depressed.

With the withdrawal of the ignition angle intervention, on the one hand, the torque, which can be called up spontaneously, increases and, on the other hand, the mass throughput and the enthalpy available to the turbine of the exhaust-gas turbocharger increase so that several start-drive improving effects positively superpose.

Priority is claimed herein on the following german patent applications: 102 03 973.9, filed Jan. 31, 2002; 102 12 984.3, filed Mar. 22, 2002; and, 102 35 891.5, filed Aug. 6, 2002, and the content thereof is incorporated herein by reference.

It is understood that the foregoing description is and the that of the preferred embodiments of the invention and that various changes and modifications may be made thereto without departing from the spirit and scope of the invention as defined in the appended claims.

What is claimed is:

1. A method for controlling a charger of an internal combustion engine, the method comprising the steps of:

forming a drive signal for driving said charger with said charger being configured as an electric auxiliary charger;

in dependence upon a first operating state of said engine which precedes an increase of a driver command torque, forming said drive signal in such a manner that said charger increases the rpm thereof already during said first operating state; and, increasing the rpm of said electric charger during said first operating state to a pregiven value and/or with a pregiven slope.

2. The method of claim 1, wherein said first operating state is arrived at by actuating a clutch.

3. The method of claim 1, wherein said first operating state is arrived at by detecting an acceleration operation or a drive-start operation of at least one forward traveling vehicle.

4. A method for controlling a charger of an internal combustion engine, the method comprising the steps of:
forming a drive signal for driving said charger; and,
in dependence upon a first operating state of said engine which precedes an increase of a driver command torque, forming said drive signal in such a manner that said charger increases the rpm thereof already during said first operating state wherein said first operating state is arrived at by releasing the brake pedal while a first driving stage is engaged.

5. A method for controlling a charger of an internal combustion engine, the method comprising the steps of:
forming a drive signal for driving said charger;
in dependence upon a first operating state of said engine which precedes an increase of a driver command torque, forming said drive signal in such a manner that said charger increases the rpm thereof already during said first operating state; and,
wherein a first bypass, which is connected in parallel with said charger, is opened when there is an increase of the rpm during said first operating state.

6. A method for controlling a charger of an internal combustion engine, the method comprising the steps of:
forming a drive signal for driving said charger;
in dependence upon a first operating state of said engine which precedes an increase of a driver command torque, forming said drive signal in such a manner that said charger increases the rpm thereof already during said first operating state;
wherein said charger is configured as an electric auxiliary charger; and, the rpm of said electric auxiliary charger is increased during said first operating state to a pregiven value and/or with a pregiven slope; and,
wherein the pregiven value for the rpm is formed in dependence upon the formation of the rpm of said electric auxiliary charger when there is a preceding increase of said driver command torque.

7. The method of claim 6, wherein the pregiven value is increased when a formation of the rpm of said electric auxiliary charger takes place when there is a preceding increase of the driver command torque based upon a gradient of an accelerator pedal position above pregiven threshold value.

8. The method of claim 6, wherein the pregiven value is reduced when a formation of the rpm of said electric auxiliary charger takes place for a preceding increase of said driver command torque based on a compressor characteristic field.

9. A method for controlling a charger of an internal combustion engine, the method comprising the steps of:
forming a drive signal for driving said charger;
in dependence upon a first operating state of said engine which precedes an increase of a driver command torque, forming said drive signal in such a manner that said charger increases the rpm thereof already during said first operating state; and,
wherein a torque reserve is formed during said first operating state.

10. The method of claim 9, wherein said charger is configured as an electric auxiliary charger; and, said reserve torque is formed in dependence upon the formation of the rpm of said electric auxiliary charger when there is a preceding increase of the driver command torque.

11. The method of claim 10, wherein: in said first operating state of said engine, an operating variable of said engine is estimated for a second operating state which follows said first operating state; and, the rpm of said electric auxiliary charger is increased in said first operating state when the estimated operating variable lies in a pregiven operating range.

12. The method of claim 11, wherein said operating variable is the engine rpm.

13. The method of claim 11, wherein the estimation of said operating variable is carried out based on a set gear stage of a transmission expected in the subsequent second operating state.

14. A method for controlling a charger of an internal combustion engine, the method comprising the steps:
forming a drive signal for driving said charger;
in dependence upon a first operating state of said engine which precedes an increase of a driver command torque, forming said drive signal in such a manner that said charger increases the rpm thereof already during said first operating state; and,
wherein said charger is configured as a mechanical auxiliary charger; during said first operating state, said drive signal is configured in such a manner that a shift clutch of said mechanical auxiliary charger is closed to a crankshaft of said engine.

15. The method of claim 14, wherein: during said first operating state, a second bypass is closed; and, said second bypass is connected in parallel to said mechanical auxiliary charger.

16. An arrangement for controlling a charger of an internal combustion engine, the arrangement comprising:
means for forming a drive signal for driving said charger with said charger being configured as an electric auxiliary charger;
in dependence upon a first operating state of said engine which directly precedes an increase of a driver command torque, said means including means for forming said drive signal in such a manner that said charger increases the rpm thereof already during said first operating state; and,
means for increasing the rpm said electric charger during said first operating state to a pregiven value and/or with a pregiven slope.

17. An arrangement for controlling a charger of an internal combustion engine, the arrangement comprising:
means for forming a drive signal for driving said charger;
in dependence upon a first operating state of said engine which directly precedes an increase of a driver command torque, said means including means for forming said drive signal in such a manner that said charger increases the rpm thereof already during said first operating state; and,
wherein a torque reserve is formed during said first operating state.

18. An arrangement for controlling a charger of an internal combustion engine, the arrangement comprising:
means for forming a drive signal for driving said charger;
in dependence upon a first operating state of said engine which directly precedes an increase of a driver command torque, said means including means for forming said drive signal in such a manner that said charger increases the rpm thereof already during said first operating state; and, wherein said charger is configured as a mechanical auxiliary charger; during said first operating state, said drive signal is configured in such a manner that a shift clutch of said mechanical auxiliary charger is closed to a crankshaft of said engine.

* * * * *